United States Patent
Goto et al.

(10) Patent No.: US 8,292,737 B2
(45) Date of Patent: Oct. 23, 2012

(54) ENTERTAINMENT SYSTEM

(75) Inventors: Teiyu Goto, Saitama (JP); Katsu Saito, Saitama (JP); Akio Ohba, Kanagawa (JP); Hiroyuki Segawa, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 687 days.

(21) Appl. No.: 12/067,468

(22) PCT Filed: Feb. 23, 2007

(86) PCT No.: PCT/JP2007/000121
§ 371 (c)(1),
(2), (4) Date: Apr. 25, 2008

(87) PCT Pub. No.: WO2007/105356
PCT Pub. Date: Sep. 20, 2007

(65) Prior Publication Data
US 2010/0062854 A1    Mar. 11, 2010

(30) Foreign Application Priority Data

Mar. 14, 2006   (JP) ................................. 2006-070059

(51) Int. Cl.
*A63F 9/24* (2006.01)
(52) U.S. Cl. ................. 463/36; 463/30; 463/31; 463/32; 463/33; 463/37; 463/38; 463/39; 463/40; 700/91; 700/92; 700/93; 273/148 B
(58) Field of Classification Search ............. 463/30–33, 463/36–40; 341/20; 700/90–931; 273/148 B; 345/169

See application file for complete search history.

(56) References Cited

U.S. PATENT DOCUMENTS 4,796,019 A * 1/1989 Auerbach .................... 345/169
(Continued)

FOREIGN PATENT DOCUMENTS

EP            1287864 A2      3/2003
(Continued)

OTHER PUBLICATIONS

Specification of utility model M266959, R.O.C: The Intellectual Property Office of Ministry of Economic Affairs, laid open on Jun. 11, 2005.*

(Continued)

*Primary Examiner* — Dmitry Suhol
*Assistant Examiner* — Jason Skaarup
(74) *Attorney, Agent, or Firm* — Matthew B. Dernier, Esq.; Gibson & Dernier LLP

(57) ABSTRACT

The present invention provides a game system using LEDs in a controller 20. In a game system of the present invention, an image pickup apparatus captures the controller. The controller includes multiple input units for making an operation input to advance a game, and multiple LEDs for indicating a controller number set for the controller in a game application executed. A game apparatus accepts an operation input provided to the controller and reflects the operation input in the processing of a game application, acquires a captured image from the image pickup apparatus, acquires the position of the controller in the captured image based on the position of the LED in the captured image and reflects the acquired position information in the processing of the game application, and generates an image signal showing the result of application processing performed based on the operation input and acquired position information.

4 Claims, 12 Drawing Sheets

U.S. PATENT DOCUMENTS

| | | | |
|---|---|---|---|
| 4,959,810 A * | 9/1990 | Darbee et al. ............... 398/112 |
| 5,227,985 A * | 7/1993 | DeMenthon ............... 702/152 |
| 5,414,426 A * | 5/1995 | O'Donnell et al. ........... 341/176 |
| 5,874,906 A | 2/1999 | Willner et al. |
| 6,238,289 B1 | 5/2001 | Sobota et al. |
| 6,402,616 B1 | 6/2002 | Ogata |
| 6,511,378 B1 * | 1/2003 | Bhatt et al. ................ 463/36 |
| 6,544,124 B2 | 4/2003 | Ireland et al. |
| 6,773,349 B2 | 8/2004 | Hussaini et al. |
| 6,850,221 B1 * | 2/2005 | Tickle ........................ 345/158 |
| 7,084,888 B2 | 8/2006 | Takahama et al. |
| 7,331,856 B1 | 2/2008 | Nakamura |
| 7,548,230 B2 * | 6/2009 | Corson ....................... 345/158 |
| 7,596,466 B2 * | 9/2009 | Ohta .......................... 702/152 |
| 7,774,155 B2 * | 8/2010 | Sato et al. ................... 345/169 |
| 7,850,526 B2 * | 12/2010 | Zalewski et al. ............. 463/36 |
| 7,854,655 B2 * | 12/2010 | Mao et al. ................... 463/30 |
| 7,874,917 B2 * | 1/2011 | Marks et al. ................. 463/36 |
| 2001/0050672 A1 | 12/2001 | Kobayashi |
| 2003/0032478 A1 | 2/2003 | Takahama et al. |
| 2003/0199325 A1 | 10/2003 | Wang |
| 2004/0058733 A1 | 3/2004 | Hussaini et al. |
| 2004/0063480 A1 | 4/2004 | Wang |
| 2004/0063481 A1 * | 4/2004 | Wang ........................... 463/8 |
| 2004/0063502 A1 | 4/2004 | Hussaini et al. |
| 2004/0141321 A1 | 7/2004 | Dowling et al. |
| 2004/0207597 A1 * | 10/2004 | Marks ......................... 345/156 |
| 2004/0224768 A1 | 11/2004 | Hussaini et al. |
| 2004/0263696 A1 | 12/2004 | Rogers |
| 2005/0037844 A1 * | 2/2005 | Shum et al. ................. 463/36 |
| 2005/0221894 A1 | 10/2005 | Lum et al. |
| 2006/0033713 A1 * | 2/2006 | Pryor ......................... 345/158 |
| 2006/0079328 A1 | 4/2006 | Wang |
| 2007/0049374 A1 * | 3/2007 | Ikeda et al. .................. 463/30 |
| 2007/0050597 A1 * | 3/2007 | Ikeda ............................. 712/1 |
| 2007/0093291 A1 * | 4/2007 | Hulvey ......................... 463/36 |
| 2008/0300055 A1 * | 12/2008 | Lutnick et al. ............... 463/39 |
| 2010/0214214 A1 * | 8/2010 | Corson et al. ............... 345/158 |

FOREIGN PATENT DOCUMENTS

| | | |
|---|---|---|
| EP | 1402929 A1 | 3/2004 |
| JP | 6301476 A | 10/1994 |
| JP | 200082108 | 3/2000 |
| JP | 2000102674 A | 4/2000 |
| JP | 2000172431 A | 6/2000 |
| JP | 2000259340 A | 9/2000 |
| JP | 2001321564 A | 11/2001 |
| JP | 2002101478 A | 4/2002 |
| JP | 2002202843 A | 7/2002 |
| JP | 2003254716 | 9/2003 |
| WO | 2005073838 A2 | 8/2005 |

OTHER PUBLICATIONS

International Preliminary Report on Patentability for Corresponding PCT Application PCT/JP2007/000121, Sep. 16, 2008.
Office Action for corresponding Korean application No. 10-2008-7018327, Apr. 8, 2010.
International Search Report for Corresponding Application PCT/JP2007/000121.
Co-pending U.S. Appl. No. 11/683,543, filed Mar. 8, 2007.
Office Action for U.S. Appl. No. 11/683,543 dated: Dec. 15, 2009.
Office Action for U.S. Appl. No. 11/683,543 dated: Jul. 1, 2009.
Office Action for corresponding Chinese Application No. 200780000847.8, Apr. 15, 2011.
Office Action for related U.S. Appl. No. 11/683,543, dated Oct. 20, 2011.
Office Action for corresponding Japanese Patent Application No. 2006-070059, Jun. 14, 2011.
Office Action for corresponding Japanese Patent Application No. 2006-070059, dated Oct. 4, 2011.
Office Action for related U.S. Appl. No. 11/683,543, dated Mar. 13, 2012.
EPO Search Report for corresponding European Application No. 07713503.6, dated Feb. 16, 2012.

* cited by examiner

ENTERTAINMENT SYSTEM

TECHNICAL FIELD

The present invention relates to a technique for recognizing objects in real space.

BACKGROUND ART

Recently, a technology for capturing a two-dimensional code with a camera, recognizing the code data, and performing predetermined processing associated with that code data has been proposed. Compared to a one-dimensional bar code, a two-dimensional code can store greater amounts of information. Various types of two-dimensional code are put to practical use at present. Accordingly, techniques have been heretofore proposed as to the image recognition of two-dimensional code (for example, see Patent Document 1).

There are various types of measuring systems that utilize magnetic, ultrasonic, or optical means in order to acquire three-dimensional positions, orientations, and the like of objects in real space. Magnetic-based measuring systems are susceptible to the influence of electronic equipment in the environment, terrestrial magnetism, and the like. Ultrasonic-based measuring systems are susceptible to ambient pressures, temperatures, and so on. Optical-based measuring systems, on the other hand, are not susceptible to surrounding magnetic fields, air pressures, temperatures, and the like since they use images captured by a camera. For example, technologies in which a plurality of LEDs arranged on an object are blinked in respective uniquely-defined blink patterns have been proposed. Here, images captured by a two-dimensional image sensor are used to recognize a three-dimensional position and orientation of the object (for example, see Patent Document 2). In the Patent Document 2, LEDs functioning as markers are provided with respective pieces of identification information for unique identification.

[Patent Document 1] Japanese Patent Laid-Open Publication No. 2000-82108

[Patent Document 2] Japanese Patent Laid-Open Publication No. 2003-254716

SUMMARY OF THE INVENTION

With technological advances in recent years, game systems have improved exponentially in terms of their hardware capabilities. This has led to diversified game applications. Lately, game systems comprising a camera and a game apparatus connected to each other have been realized, so that when a user moves his/her body in front of the camera, the game apparatus optically recognizes the user's motion and utilizes it as a game input. In such a gaming environment, the inventor has arrived at a concept for a novel game system and controller which make effective use of a camera in connection with a game apparatus. Moreover, if it is possible to capture the image of an object in real space with the camera, process information regarding the object based on the captured image, and display the processed information on an image display apparatus, then it is expected that useful applications can be produced not only for game systems but also in other environments such as entertainment systems in education and businesses.

In view of the foregoing, it is a general purpose of an embodiment of the present invention to provide an entertainment system which has a novel application processing function, and an operation input apparatus which is used in the entertainment system.

To solve the problem above, one embodiment of the present invention provides an entertainment system, which comprises: an operation input apparatus from which a user makes an operation input; a processing apparatus which processes an application based on an operation input in the operation input apparatus and generates an image signal for showing the result of processing of an application; an image pickup apparatus which captures the operation input apparatus; and an image display apparatus which outputs an image signal generated in the processing apparatus.

In the entertainment system of this embodiment, the operation input apparatus includes a plurality of input units from which a user makes an operation input for advancing an application, and a plurality of light emitting elements for indicating a number set for the operation input apparatus in an application executed. Also, the processing apparatus has functions of accepting an operation input provided to the operation input apparatus and reflecting the operation input in the processing of an application, acquiring a captured image from the image pickup apparatus, acquiring the position of the operation input apparatus in a captured image based on the position of the light emitting element in the captured image and reflecting the acquired position information in the processing of an application, and generating an image signal showing the result of application processing performed based on an operation input and acquired position information.

Another embodiment of the present invention relates to a game controller for transmitting user's operation inputs to a game apparatus. The game controller of this embodiment comprises: a grip to be held by a user; a plurality of input units which are provided on the top of a case so that the user can make an operation input thereon while holding the grip; a transmission unit which transmits to the game apparatus an operation input provided through the input unit; and a plurality of light emitting elements which are provided on the rear of the case.

Optional combinations of the aforementioned constituting elements, and implementations of the invention in the form of methods, apparatuses, systems, recording mediums and computer programs may also be practiced as additional modes of the present invention.

DETAILED DESCRIPTION OF THE INVENTION

Figure 1:
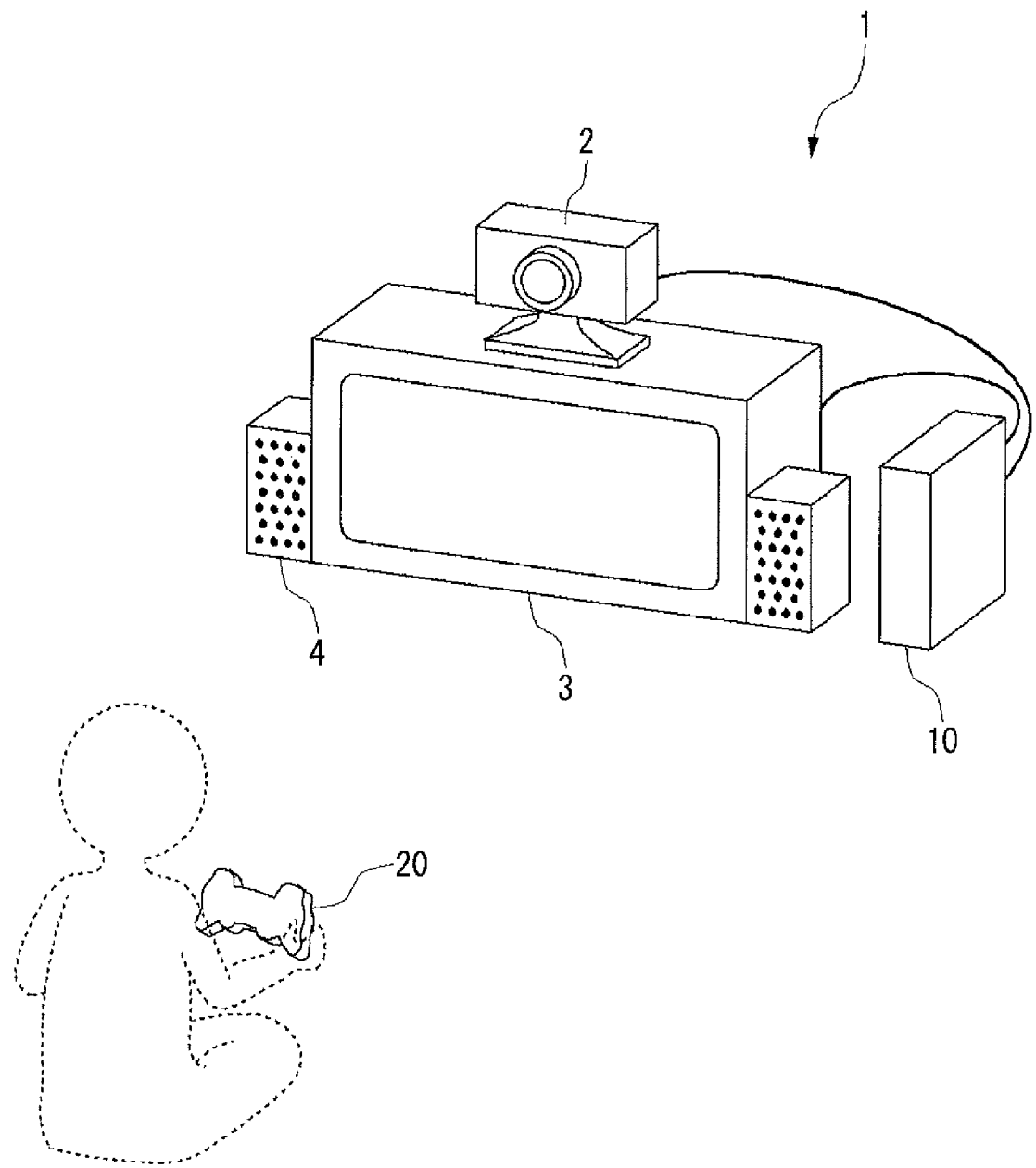
FIG. 1 is a diagram showing use environment of a game system according to an embodiment of the present invention.

FIG. 1 shows the use environment of a game system according to an embodiment of the present invention. The game system 1 includes an image pickup apparatus 2, an image display apparatus 3, a sound output apparatus 4, a game apparatus 10, and a controller 20. The image pickup apparatus 2, the image display apparatus 3, the sound output apparatus 4, and the controller 20 are connected with the game apparatus 10.

The controller 20 is an operation input apparatus from which a user makes operation inputs. The game apparatus 10 is a processing apparatus which processes a game application based on operation inputs from the controller 20, and generates image signals for showing the results of the processing of the game application. It should be appreciated that the technology shown in the present embodiment can also be applied to an entertainment system that has a processing unit for executing other types of applications, not necessarily game applications. As a typical example of the entertainment system, a description will hereinafter be given of the game system 1 which executes a game application.

The image pickup apparatus 2 is a video camera having a CCD imaging sensor, a CMOS image sensor, or the like. It captures images of real space in a cycle, and generates a frame image in each cycle. As an example, the capturing cycle of the image pickup apparatus 2 may be 30 images per second, which coincides with the frame rate of the image display apparatus 3. The image pickup apparatus 2 is connected with the game apparatus 10 through a USB (Universal Serial Bus) or other interface.

The image display apparatus 3 is a display for outputting image signals. It receives image signals generated by the game apparatus 10, and displays a game screen. The sound output apparatus 4 is composed of speakers for outputting sounds. It receives sound signals generated by the game apparatus 10, and outputs game sounds. The image display apparatus 3 and the sound output apparatus 4 constitute an output apparatus of the game system 1.

The game apparatus 10 and the image display apparatus 3 may be connected either by cabled means or by wireless means. The game apparatus 10 and the image display apparatus 3 may be connected through AV cables. A home network may be constructed between the game apparatus 10 and the image display apparatus 3 using network (LAN) cables or wireless LAN.

The controller 20 can transmit user's operation inputs to the game apparatus 10. In the present embodiment, it is configured as a wireless controller which is capable of wireless communication with the game apparatus 10. The controller 20 and the game apparatus 10 may establish wireless communication therebetween using the Bluetooth™ protocol. The game apparatus 10 can hold wireless communication with a plurality of controllers 20. In other words, the game system 1 can provide one-to-N connection between the game apparatus 10 and the controllers 20. The game apparatus 10 functions as a master unit. The controllers 20 function as slave units. It should be appreciated that the controllers 20 are not limited to wireless controllers, but may be cable controllers which are connected to the game apparatus 10 via cables.

The controller 20 is driven by a battery not shown, and is provided with a plurality of buttons and keys for making operation inputs to allow game progress. When a user operates the buttons and keys on the controller 20, the operation inputs are transmitted to the game apparatus 10 by wireless means. The game apparatus 10 receives the operation inputs pertaining to the game application from the controller 20, controls the progress of the game according to the operation inputs, and generates game image signals and game sound signals. These game image signals and game sound signals are output through the image display apparatus 3 and the sound output apparatus 4, respectively. The game apparatus 10 can also transmit a vibration control signal to the controller 20 to cause the controller 20 to vibrate depending on the progress of the game application. The controller 20 contains a vibrator, and makes the vibrator vibrate when it receives the vibration control signal.

In the game system 1 of the present embodiment, the controller 20 is provided with a plurality of light emitting elements. The plurality of light emitting elements are LEDs all of the same color. They have the role of an indicator for indicating a controller number which is set by the game application. The controller number given by the game application is used, for example, when the user selects a game character in starting the game. The controller number must therefore be notified to the user by some means. Accordingly, the controller 20 notifies the user of the controller number, for example, with the first LED out of the plurality of LEDS being lit when the controller number is 1, and the second LED being lit when the controller number is 2. It should be appreciated that controller numbers may be expressed by combinations of a plurality of LEDs.

If the controller 20 is a cable controller, the controller number may be determined by the position of the port in the game apparatus 10 where the cable connector extending from the controller 20 is plugged in. Nevertheless, in such cases where the game apparatus 10 is used with an external multiport device having a plurality of ports, it is difficult for users to recognize their controller numbers immediately. Thus, controller numbers are preferably notified to users with the plurality of LEDs.

The game system 1 uses the LEDs of the controller 20 not only as the controller number indicator, but also as a game input means which influences the progress of the game application. In this case, the LED control is switched from the mode of lighting as an indicator to the mode of lighting as an input to the game application. The image pickup apparatus 2 captures an image of the LEDs of the controller 20, generates a frame image, and supplies it to the game apparatus 10. The game apparatus 10 acquires the frame image, estimates and acquires the position and orientation of the controller 20 in the frame image based on the positions of LED images in the frame image, and reflects the acquired position information and/or orientation information in the processing of the game application. That is, the game apparatus 10 of the present embodiment processes the game application using not only the operation inputs made from the controller 20 but also the acquired position information and/or orientation information regarding the controller 20, thereby generating image signals that shows the results of the processing.

Figure 2:
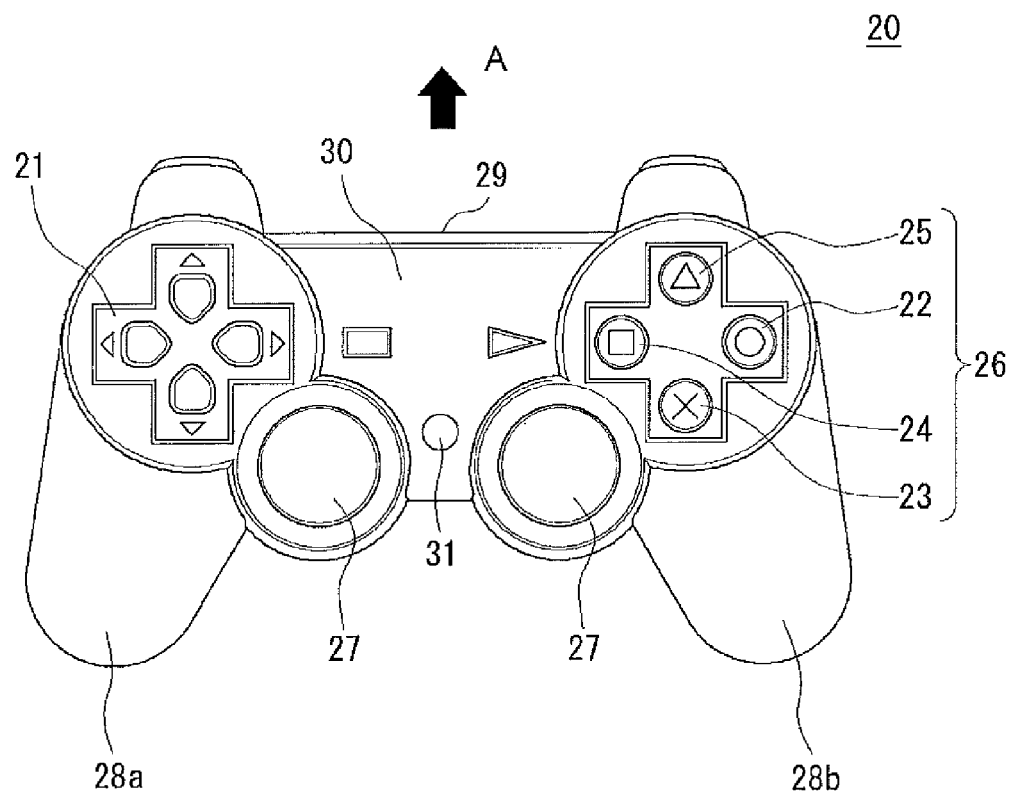
FIG. 2 is a diagram showing the external configuration of a controller.

FIG. 2 shows the external configuration of the controller. The controller 20 has arrow keys 21, analog sticks 27, and four types of operation buttons 26. The arrow keys 21, the analog sticks 27, and the operation buttons 26 are input units provided on the top 30 of the case. The four types of buttons 22 to 25 are marked with different symbols in different colors in order to distinguish them from each other. More specifically, the ○ button 22 is marked with a red circle, the × button 23 a blue cross, the □ button 24 a purple square, and the Δ button a green triangle. The rear 29 of the case of the controller 20 is provided with a plurality of LEDs.

The user holds a left grip 28a with the left hand and a right grip 28b with the right hand when operating the controller 20. The arrow keys 21, the analog sticks 27, and the operation buttons 26 are arranged on the case top 30 so that the user can operate them while holding the left grip 28a and the right grip 28b.

An LED-bearing button 31 is also provided on the case top 30. The LED-bearing button 31 is used, for example, for instructing the image display apparatus 3 to display a menu screen. The LED-bearing button 31 can also notify the user of incoming mails, and can indicate the battery level of the controller 20 and the like by modifying the lighting status of the LED. For example, the LED is lit in red during charging, lit in green when fully charged, and blinks in red when the level of the battery is low.

The user watches the game screen displayed on the image display apparatus 3 when playing games. The image display apparatus 3 is therefore located ahead of the controller 20 as shown by the arrow A. It follows that the LED-bearing case rear 29 usually faces toward the image display apparatus 3. In the present embodiment, the image pickup apparatus 2 needs to capture an image of the LEDs while the game application is executed. The image pickup apparatus 2 is thus preferably situated so that its image field faces the same direction as the image display apparatus 3, and so that it faces toward the case rear 29 of the controller 20. In general, users play games directly in front of the image display apparatus 3. Accordingly, the image pickup apparatus 2 is arranged so that the direction of its optical axis coincides with the direction faced by the image display apparatus 3. Specifically, the image pickup apparatus 2 is preferably arranged near the image display apparatus 3 so that its capturing range covers positions from which the user can view the display screen of the image display apparatus 3. This allows the image pickup apparatus 2 to capture an image of the user's body and the controller 20.

Figure 3:
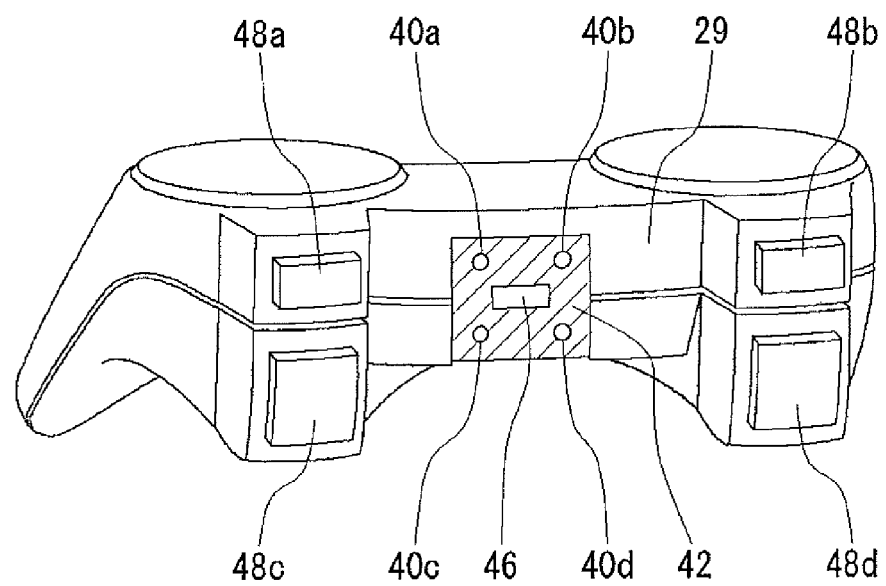
FIG. 3 is a diagram showing the external configuration of the controller from the rear side.

FIG. 3 shows the external configuration of the controller from the rear. In FIG. 3, the arrow keys 21, the operation buttons 26, and the like provided on the case top 30 of the controller 20 are omitted. An LED layout area 42 is provided on the case rear 29. A first LED 40a, a second LED 40b, a third LED 40c, and a fourth LED 40d are arranged in the LED layout area 42. Hereinafter, the first LED 40a, the second LED 40b, the third LED 40c, and the fourth LED 40d will be referred to collectively as "LEDs 40." The LED layout area 42 is provided in the central area of the case rear 29. A USB connector 46 is provided at the center of the LED layout area 42. A USB cable extending from the game apparatus 10 may be connected to the USB connector 46 to charge the controller 20. It should be appreciated that the controller 20 can also be used as a cabled controller when the USB cable is connected.

Operation buttons 48a, 48b, 48c, and 48d are provided on the both sides on the case rear 29, with the LED layout area 42 in between. The operation buttons 48a, 48b, 48c, and 48d are located at positions where they can be operated with the tips of the forefingers when the user holds the left grip 28a and the right grip 28b. This precludes the LEDs 40 from being covered by the forefingers while the operation buttons 48a, 48b, 48c, and 48d are operated.

The LEDs 40 are used as indicators for indicating the controller number. From the viewpoint of the user who uses the controller 20, it is undesirable to arrange the LEDs 40 on the exposed case top 30 since they only have to be checked once. Meanwhile, when there are other users, the LEDs 40 arranged on the case rear 29 have the advantage of being easily viewable by the other users. Furthermore, since the LED-bearing button 31 is positioned on the case top 30, the LEDs 40 may be confusing if they are arranged there. For these reasons, the controller 20 is configured with the LEDs 40 on the case rear 29.

The image pickup apparatus 2 acquires RGB luminance values pixel by pixel. In order for lighted LEDs 40 to be detected accurately, it is preferable that the LEDs 40 and the peripheral area around the LEDs 40 have a high lightness contrast. For this purpose, the LED layout area 42 has a darker color than the adjacent color of the case, such as black. The LED layout area 42 is made of a black semitransparent plate, and the LEDs 40 are arranged behind it, i.e., inside the case. Consequently, the LEDs 40 are invisible to the image pickup apparatus 2 when not lit, and an image of them can be captured only when lit. The black semitransparent plate can diffuse light so that the narrow directivity of the LEDs 40 is transformed into wide directivity. Arranging the LEDs 40 in the LED layout area 42 can therefore enhance the contrast of the lighted LEDs 40. This makes it possible to extract the LED images from frame images effectively in subsequent image processing.

The first LED 40a, the second LED 40b, the third LED 40c, and the fourth LED 40d are arranged in a predetermined two-dimensional pattern. For example, the first LED 40a, the second LED 40b, the third LED 40c, and the fourth LED 40d are arranged in positions corresponding to the vertexes of a rectangle. The game apparatus 10 is provided with this positional relationship in advance, and uses it when extracting LED images. Numerals are stamped or printed near the respective LEDs 40, so that the user can check the numerals near lighted LEDs 40 to recognize the controller number.

Figure 4:
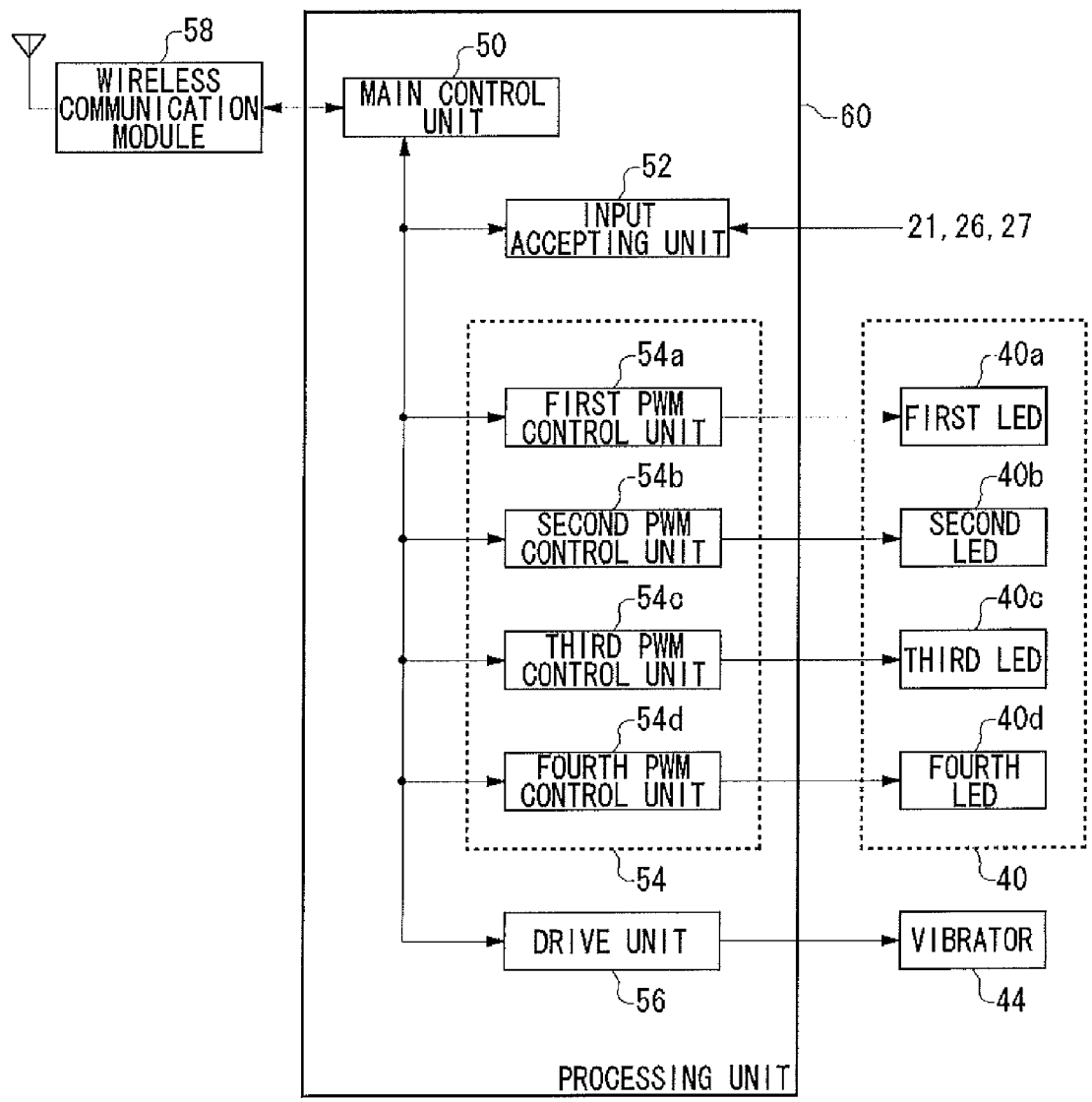
FIG. 4 is a diagram showing the internal configuration of the controller.

FIG. 4 shows the internal configuration of the controller. The controller 20 has a wireless communication module 58, a processing unit 60, the LEDs 40, and a vibrator 44. The wireless communication module 58 can transmit and receive data to/from a wireless communication module of the game apparatus 10. The processing unit 60 performs certain processing in the controller 20.

The processing unit 60 includes a main control unit 50, an input accepting unit 52, a pulse width modulation (PWM) control unit 54, and a drive unit 56. The main control unit 50 exchanges necessary data with the wireless communication module 58.

The input accepting unit 52 receives input information from the input units, including the arrow keys 21, the operation buttons 26, and the analog stick 27, and sends the information to the main control unit 50. The main control unit 50 supplies the received input information to the wireless communication module 58. The wireless communication module 58 transmits it to the game apparatus 10 at a certain time. Moreover, when receiving a vibration control signal from the game apparatus 10, the wireless communication module 58 supplies it to the main control unit 50. Based on the vibration control signal, the main control unit 50 operates the drive unit 56 which makes the vibrator 44 vibrate. The drive unit 56 may be configured as a switch for driving the vibrator 44, or as a PWM control unit which adjusts the duty ratio of the supply voltage thereto.

In the present embodiment, the PWM control unit 54 is composed of a first PWM control unit 54a, a second PWM control unit 54*b*, a third PWM control unit 54*c*, and a fourth PWM control unit 54*d*. The first PWM control unit 54*a*, the second PWM control unit 54*b*, the third PWM control unit 54*c*, and the fourth PWM control unit 54*d* are provided in order to control the lighting of the first LED 40*a*, the second LED 40*b*, the third LED 40*c*, and the fourth LED 40*d*, respectively. The PWM control unit 54 controls the voltages to be applied to the LEDs 40 by pulse width modulation (PWM). For example, the PWM control unit 54 can PWM-control the applied voltages at high frequencies of several kilohertz, thereby adjusting the luminance of the LEDs 40. The PWM control unit 54 can also PWM-control the applied voltages at low frequencies of several hertz to one hundred hertz or so, thereby allowing the image pickup apparatus 2 to recognize whether the LEDs 40 are lit or unlit.

In the game system 1 of the present embodiment, a user who wishes to join the game system 1 initially makes his/her controller 20 establish communication with the game apparatus 10. At this time, identification information regarding the controller 20, such as a Bluetooth address, is passed to the game apparatus 10. Subsequent communication will be held based on this Bluetooth address. It should be appreciated that device addresses such as a MAC address may be used if Bluetooth is not used as the communication protocol. After the communication is established, the user can join the game application.

Here, information for specifying a controller number is transmitted from the game apparatus 10 to the controller 20. Based on this number specification information, the main control unit 50 lights only an LED or LEDs 40 that correspond(s) to the given controller number. The user can thus recognize the controller number of his/her own controller 20. Instead of the number specification information, a control signal for lighting LEDs 40 corresponding to the controller number may be transmitted from the game apparatus 10. As stated above, the main control unit 50 can light any of the LEDs 40.

In the game system 1 of the present embodiment, the game apparatus 10 estimates the position and orientation of the controller 20 based on a frame image that is captured when all the LEDs 40*a* to 40*d* are lit. The estimated position and orientation are used as an input to the game application to be run. The game apparatus 10 also accepts operation inputs from the arrow keys 21, the operation buttons 26, and the like of the controller 20. Based on such input information, the game apparatus 10 generates game parameters of the game application, controls the progress of the game, and generates AV data for game images and game sounds. The AV data is output from the image display apparatus 3 and the sound output apparatus 4. Watching the game screen, the user moves the controller 20 in real space, and also makes operation inputs on the arrow key 21 and the operation button 26 to play the game. A description will now be given of the processing in the game apparatus 10.

Figure 5:
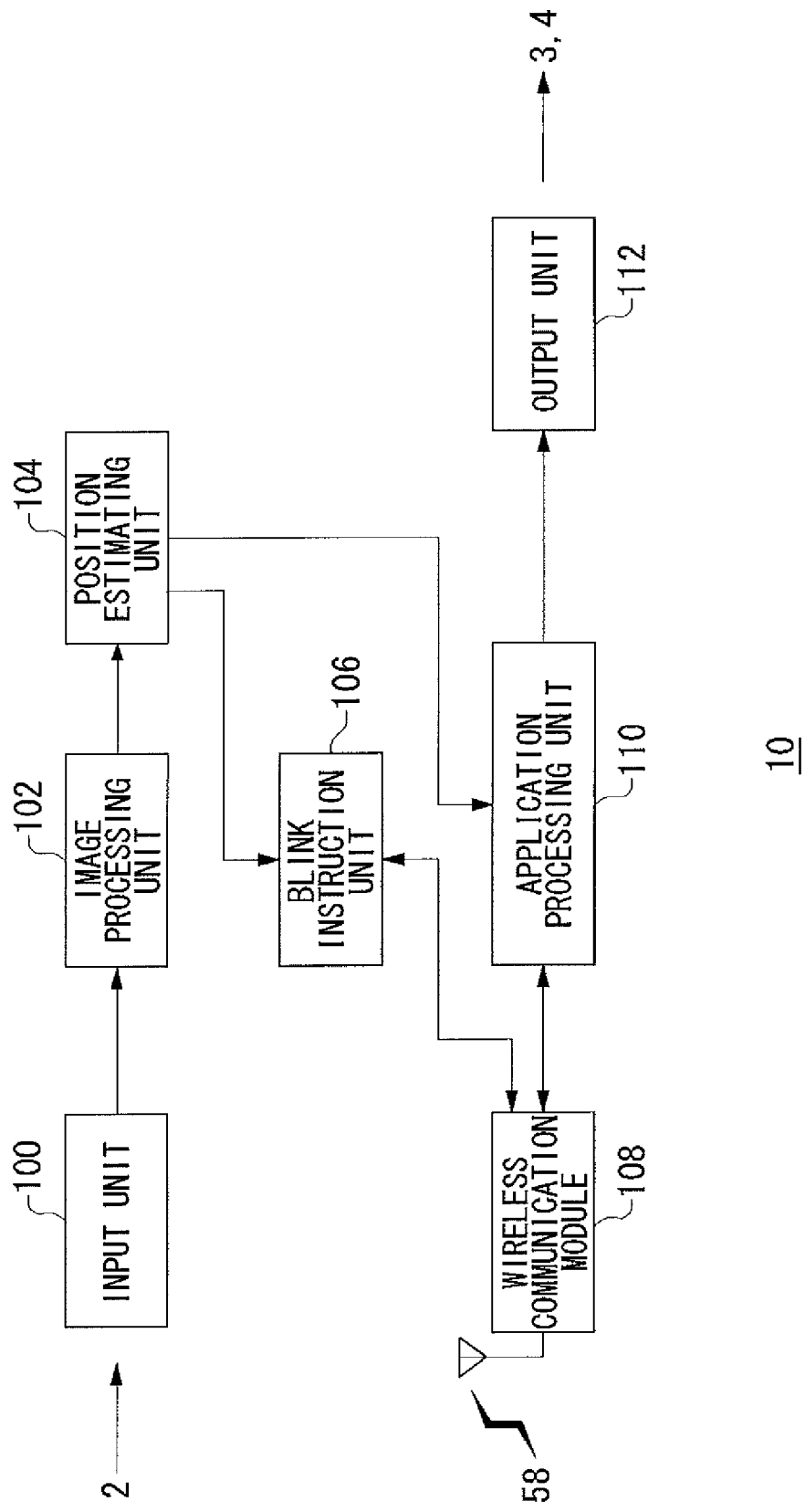
FIG. 5 is a diagram showing the configuration of a game apparatus.

FIG. 5 shows the configuration of the game apparatus. The game apparatus 10 includes an input unit 100, an image processing unit 102, a position estimating unit 104, a blink instruction unit 106, a wireless communication module 108, an application processing unit 110, and an output unit 112. The processing functions of the game apparatus 10 in the present embodiment are realized by such components as a CPU, a memory, and a program loaded into the memory. The diagram shows functional blocks that can be realized through the cooperation of these components. The program may be built into the game apparatus 10, or may be supplied from an external recording medium. It will thus be understood by those skilled in the art that these functional blocks may be configured in various forms, including hardware alone, software alone, and combinations of these. In the shown example, the CPU of the game apparatus 10 has the functions of the image processing unit 102, the position estimating unit 104, the blink instruction unit 106, and the application processing unit 110. Depending on the hardware configuration, the game apparatus 10 may have a plurality of CPUs. In such cases, one of the CPUs may function as the application processing unit 110 which executes the game application. The other CPU(s) may serve as the image processing unit 102 which processes images captured by the image pickup apparatus 2, the position estimating unit 104, and the blink instruction unit 106.

The wireless communication module 108 establishes wireless communication with the wireless communication module 58 of the controller 20. In the phase of establishing synchronization, the wireless communication module 108 inquires for connection, i.e., performs "inquiry" processing regarding terminal devices including adjacent controllers 20. Specifically, the wireless communication module 108 broadcasts an IQ (inquiry) packet to terminal devices nearby. The wireless communication modules 58 of controllers 20 that receive the IQ packet return an FHS (Frequency Hop Synchronization) packet, which includes a Bluetooth address and Bluetooth clock information, to the game apparatus 10. At this time, a fixed hopping pattern dedicated to and defined for inquiry is used for transmission and reception because no consensus as to a frequency hopping pattern has yet been made between the game apparatus 10 and the controllers 20.

The wireless communication module 108 receives the FHS packets from the controllers 20, and recognizes the kinds of controllers 20 which are there. Then, it transmits an ID packet to a given controller 20. This corresponds to "call" processing by the wireless communication module 108. When a response to the ID packet is returned from the given controller 20, the wireless communication module 108 transmits an FHS packet to the controller 20, thereby notifying the controller 20 of its own address and clock. This makes it possible for the game apparatus 10 and the controller 20 to use the same hopping pattern.

When a "call" is made, the controller 20 and the game apparatus 10 form a piconet therebetween and enter a "connected" state. A piconet refers to a network that is formed temporarily between Bluetooth terminals when the terminals are put close to each other. Up to eight Bluetooth terminals can join a single piconet. The connected controller 20 is given a slave identifier, or a 3-bit address (1 to 7) designated for a connected controller 20, from the wireless communication module 108. This slave identifier will be called AM_ADDR (Active Member ADDRess). In the "connected" state, control packets for setting a communication link are exchanged to enable "data transfer."

When the controller 20 enters the connected state and joins the game application, the application processing unit 110 assigns a controller number to the controller 20, and generates number specification information for specifying the controller number. The wireless communication module 108 transmits the number specification information to the controller 20. Receiving the number specification information, the controller 20 lights the corresponding LED(s) 40. It should be appreciated that the wireless communication module 108 may transmit a control signal that instructs LEDs 40 to be lit corresponding to the controller number, instead of the number specification information.

When the game application is started, the blink instruction unit 106 generates a control signal for specifying a blink pattern so that the controller 20 blinks in predetermined cycles. This blink control signal is transmitted from the wireless communication module 108 to the controller 20.

The input unit 100 is configured as a USB interface, and acquires frame images from the image pickup apparatus 2 at a capturing cycle (for example, 30 frames/second). The image processing unit 102 extracts LED images from frame images according to an LED extraction algorithm to be described later. The position estimating unit 104 acquires position information regarding the LED images from the extracted LED images, and estimates the position and orientation of the controller 20. The position estimating unit 104 may function as a position acquisition unit since it acquires position information regarding the LED images. The position of the controller 20 may be defined as the barycentric point between the images of four LEDs.

The position information and/or the orientation information regarding the controller 20, estimated from the positions and orientations of the four lighted LEDs 40, is used as an input to the game application. For that purpose, the position information and the orientation information regarding the controller 20, estimated by the position estimating unit 104, are sent to the application processing unit 110 in succession and reflected in the processing of the application. User inputs made by operating the arrow key 21 and the like of the controller 20 are also sent to the application processing unit 110 through the wireless communication module 108. The application processing unit 110 advances the game based on the position and orientation information regarding the controller 20 and the operation inputs from the controller 20, and generates image signals and sound signals that show the results of the processing of the game application. The image signals and the sound signals are sent from the output unit 112 to the image display apparatus 3 and the sound output apparatus 4 for output, respectively.

Figure 6:
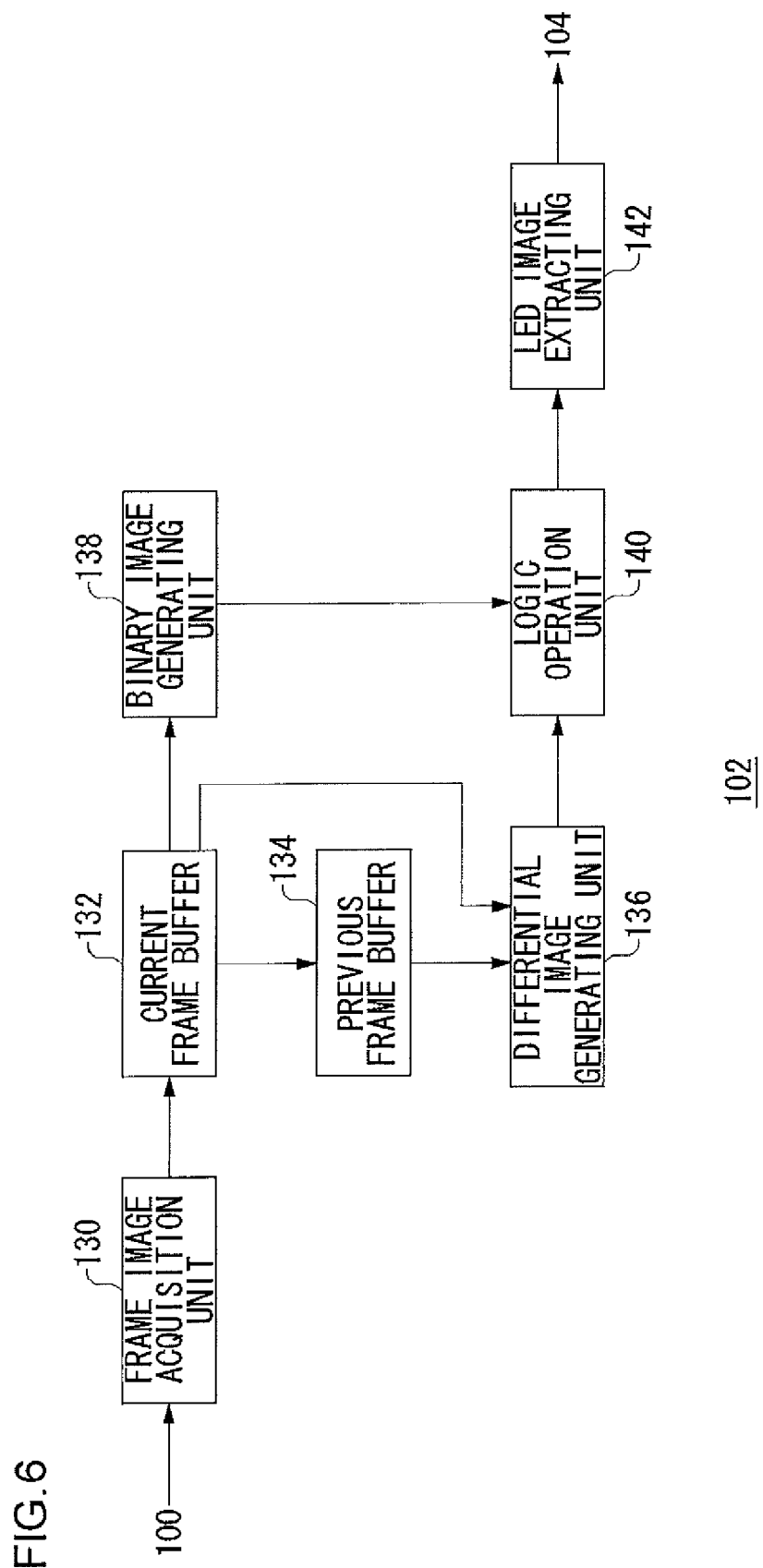
FIG. 6 is a diagram showing the configuration of an image processing unit.

FIG. 6 shows the configuration of the image processing unit. The image processing unit 102 includes a frame image acquisition unit 130, a current frame buffer 132, a previous frame buffer 134, a differential image generating unit 136, a binary image generating unit 138, a logic operation unit 140, and an LED image extracting unit 142.

The frame image acquisition unit 130 acquires frame image data from the input unit 100, and stores it temporarily in the current frame buffer 132. The previous frame buffer 134 contains data regarding the last frame image. The differential image generating unit 136 generates a differential image between the current frame data stored in the current frame buffer 132 and the previous frame data stored in the previous frame buffer 134. Where Pr is the R pixel value, Pg is the G pixel value, and Pb is the B pixel value of the previous frame data at coordinates (x, y) in a frame image, and Cr is the R pixel value, Cg is the G pixel value, and Cb is the B pixel value of the current frame data at the same coordinates (x, y), a differential image function F(x, y) is given by the following equation.

$$F(x,y) = \sqrt{(Pr-Cr)^2 + (Pg-Cg)^2 + (Pb-Cb)^2} - Th \quad (1)$$

Here, Th is a predetermined threshold.

If F(x, y) is greater than 0, the pixel values at coordinates (x, y) are encoded to "1". Then, the pixel will be displayed in white. On the other hand, if F(x, y) is less than or equal to 0, the pixel values at coordinates (x, y) are encoded to "0". Then, the pixel will be displayed in black. It follows that the differential image generated by the differential image generating unit 136 is a binarized image. The differential image can be generated to eliminate the effect of objects that remain motionless between the previous frame image and the current frame image.

The binary image generating unit 138 binarizes the current frame data using a predetermined threshold, thereby generating a binary image. The binary image generating unit 138 encodes the pixel values of pixels that have luminance higher than the predetermined threshold into "1." It encodes the pixel values of pixels that have luminance lower than or equal to the predetermined threshold into "0." Generating a binary image of the current frame image can extract only the bright objects in the current frame image.

The logic operation unit 140 performs a logic operation between the differential image generated by the differential image generating unit 136 and the binary image generated by the binary image generating unit 138, thereby generating a logic operation image. More specifically, the logic operation unit 140 performs an AND operation between the pixel values of the differential image and the pixel values of the binary image pixel by pixel, thereby generating an AND image. This AND image is generated by performing an AND operation mathematically between the corresponding pixels of the differential image and the binary image.

Figure 7A:
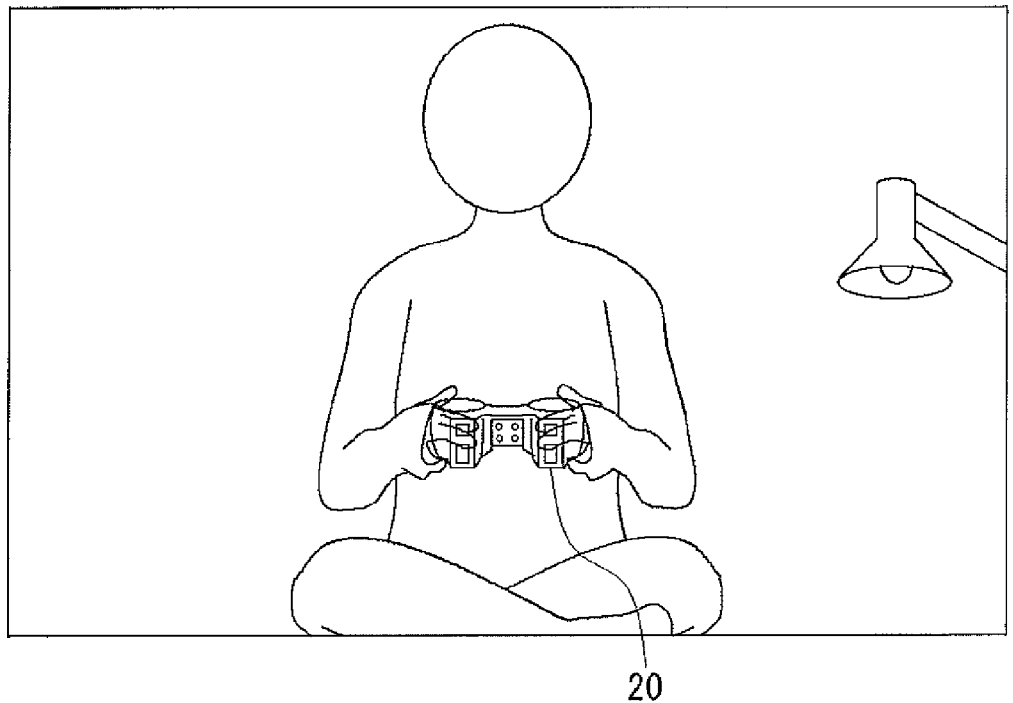
FIG. 7A is a diagram showing a current frame image.

FIG. 7A shows a current frame image. The current frame image shows a situation where a user holds the controller 20 for game play, and a lamp is lit on the right. Here, the LEDs 40 of the controller 20 are all lit. All the LEDs 40 emit light in an identical lighting pattern with an identical luminance.

Figure 7B:
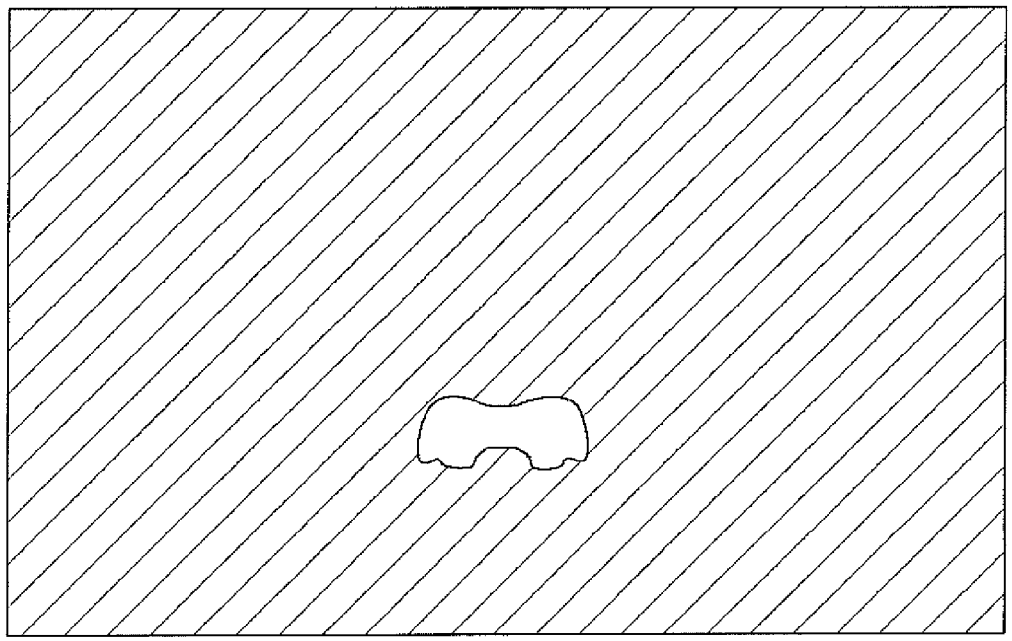
FIG. 7B is a diagram showing a differential image between the current frame image and a previous frame image.

FIG. 7B shows a differential image between the current frame image and a previous frame image. When the controller 20 is moved from its position in the previous frame image, the differential image is generated from the equation (1). In this example, the controller 20 and at least some of the areas of the body that move with the controller 20 are acquired as a white image (with pixel values of "1"). Such a white image is not always acquired, however, and what is shown in FIG. 7B is merely an example of the differential image which might be generated when the equation (1) is satisfied. The lamp is not included in the differential image since it is motionless. It should be appreciated that the white image of the controller 20 will not be acquired if the user does not move the controller 20.

Figure 8A:
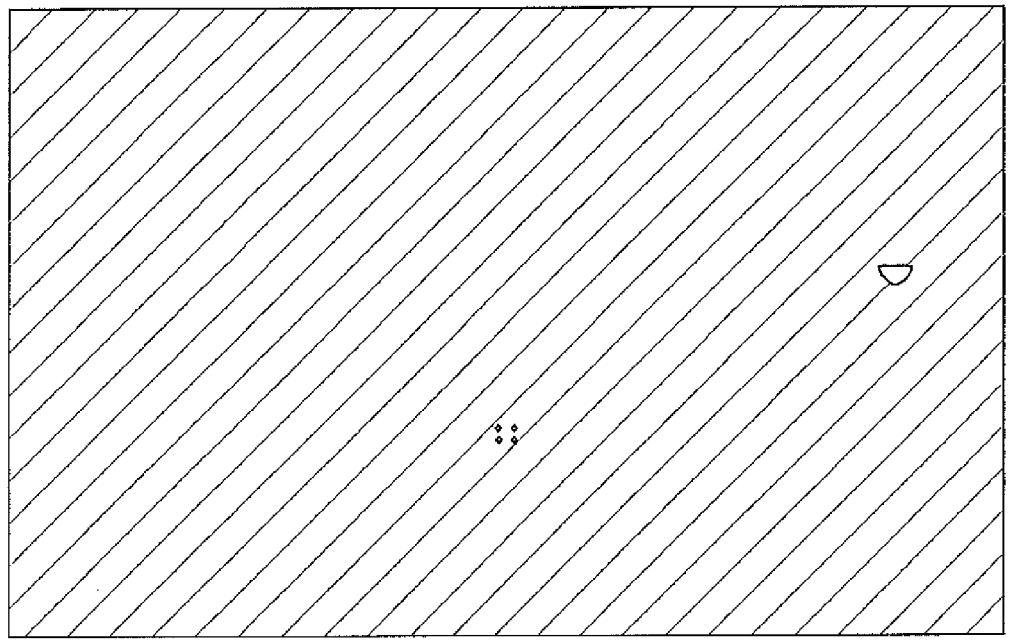
FIG. 8A is a diagram showing a binary image of the current frame image.

FIG. 8A shows a binary image of the current frame image. In the binary image, high-luminance areas of FIG. 7A, i.e., the lighted LEDs and the illumination lamp are binarized and turned into white images. For the sake of reducing foreign noise, the threshold for the binarization processing is desirably set to a luminance value that is determined by subtracting a predetermined margin value from the luminance of the LED emission.

Figure 8B:
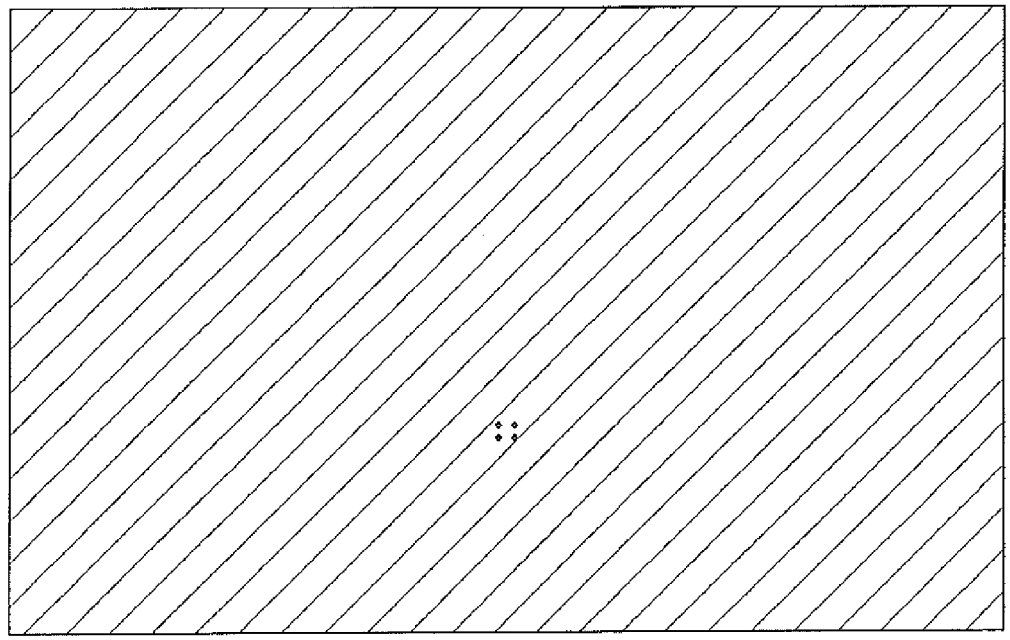
FIG. 8B is a diagram showing an AND image.

FIG. 8B shows an AND image. The AND image is obtained by performing an AND operation between the differential image shown in FIG. 7B and the binary image shown in FIG. 8A. In the differential image and the binary image, the white pixels have pixel values of "1" and the black pixels have pixel values of "0". Thus, only the pixels that are present as white pixels in both images appear as white pixels in the AND image.

As stated above, the differential image and the binary image can be logically AND operated to generate an AND image from which LED images can be easily extracted. The AND image is sent to the LED image extracting unit 142.

When the AND image has been generated, the previous frame data retained in the previous frame buffer 134 is overwritten with the current frame data retained in the current frame buffer 132. This overwrite processing may be performed immediately after the previous frame buffer 134 is read by the differential image generating unit 136. Subsequently, the current frame data retained in the current frame buffer 132 is overwritten with the next frame data, and the next frame is subjected to the process of generating an AND image.

The LED image extracting unit 142 extracts LED images from the AND image. To extract LED images, the LED image extracting unit 142 initially detects candidates for LED images. Then, the LED image extracting unit 142 assumes any one of the candidates to be the first LED 40a, and searches the peripheral area for a candidate for an LED image that may be the second LED 40b. If the second LED 40b is found, the LED image extracting unit 142 searches the peripheral area of the first LED 40a again for a candidate for an LED image that may be the third LED 40c. If the third LED 40c is found, it searches the peripheral area for a candidate for an LED image that may be the fourth LED 40d. Note that the LED image extracting unit 142 has been provided with the two-dimensional pattern to be formed by the plurality of LEDs 40 in advance, and uses this two-dimensional pattern to extract the LED images. For the sake of convenience, the following description will deal with the case where the first LED 40a, the second LED 40b, the third LED 40c, and the LED 40d form the vertexes of a square on the case rear 29 of the controller 20.

It should be appreciated that the LED image extracting unit 142 can also extract LED images from the binary image without using the AND image. Binary images contain noise as well as LED images. It is possible, however, to detect the positions and orientations of LED images by using binary images if the LED images cannot be obtained from differential images. The procedure shown below can be performed by using either an AND image or a binary image. Since AND images contain less noise components other than the LED images, the use of the AND image improves the processing speed.

Figure 9:
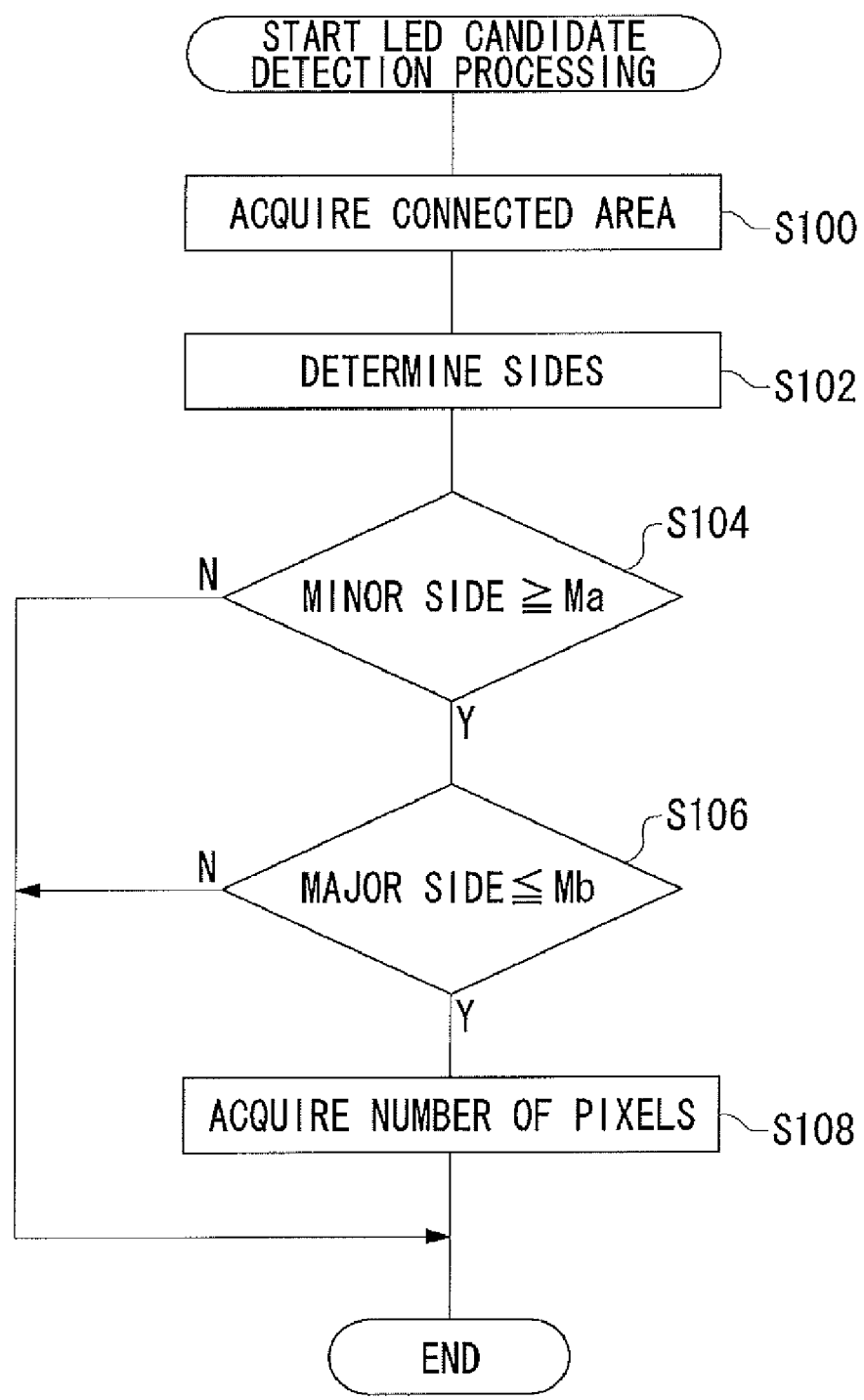
FIG. 9 is a flowchart showing the procedure for processing of detecting LED image candidates.

FIG. 9 is a flowchart showing the procedure for detecting LED image candidates. The LED image extracting unit 142 acquires an area of the AND image where consecutive white pixels (pixels having pixel values of "1") are found, as a single connected area (S100). Next, the LED image extracting unit 142 extracts the edges of the connected area of white pixels, and determines a minor side and a major side (S102).

The LED image extracting unit 142 determines whether or not the minor side contains pixels more than or equal to a predetermined number of pixels Ma (S104). If the minor side contains pixels less than the number of pixels Ma (N at S104), the LED image extracting unit 142 stops processing this connected area of white pixels since it is not an LED image. If the minor side contains pixels more than or equal to the number of pixels Ma (Y at S104), the LED image extracting unit 142 determines whether or not the major side contains pixels less than or equal to a predetermined number of pixels Mb (S106). If the major side contains pixels more than the number of pixels Mb (N at S106), the LED image extracting unit 142 stops processing this connected area of white pixels since it is not an LED image. If the major side contains pixels less than or equal to the number of pixels Mb (Y at S106), the LED image extracting unit 142 acquires the number of pixels that constitute the connected area of white pixels since it is a candidate for an LED image (S108). This LED image candidate detection processing is repeated on all the connected areas of white pixels. The LED image candidates included in the AND image can be detected in this way. Note that the coordinates of the LED image candidates are determined to be the barycenters of the respective connected areas.

Figure 10:
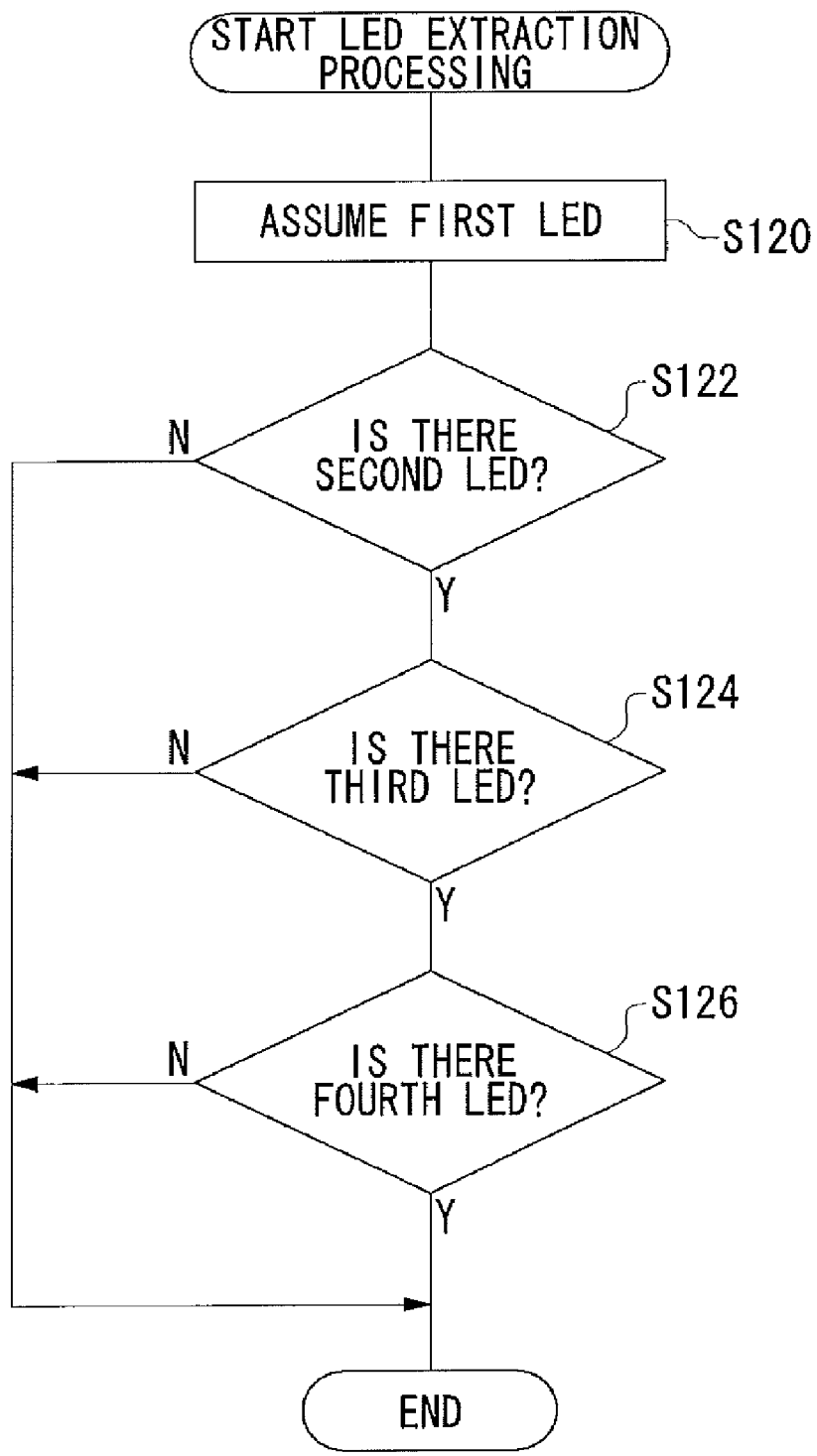
FIG. 10 is a flowchart showing the procedure for LED extraction processing.

FIG. 10 is a flowchart showing the procedure for LED extraction processing. The LED image extracting unit 142 assumes any one of the detected LED image candidates to be the first LED 40a (S120). Next, it determines whether or not there is any LED image candidate that satisfies the conditions for it to be the second LED 40b with respect to the first LED 40a (S122). If there is any LED image candidate that may be the second LED 40b (Y at S122), the LED image extracting unit 142 determines whether or not there is any LED image candidate that satisfies the conditions for it to be the third LED 40c with respect to the first LED 40a and the second LED 40b (S124). If there is any LED image candidate that may be the third LED 40c (Y at S122), the LED image extracting unit 142 determines whether or not there is any LED image candidate that satisfies the conditions for it to be the fourth LED 40d with respect to the first LED 40a, the second LED 40b, and the third LED 40c (S126). If there is any LED image candidate that may be the fourth LED 40d (Y at S126), it follows that the first LED 40a to the fourth LED 40d of the controller 20 have been extracted. It should be appreciated that if there is no candidate for the second LED image (N at S122), if there is no candidate for the third LED image (N at S124), or if there is no candidate for the fourth LED image (N at S126), then another LED image candidate is assumed to be the first LED 40a and the process of FIG. 8 is performed again.

For the sake of reducing the processing load, the LED extraction process may be performed on condition that the orientation of the controller 20 not be inclined beyond a predetermined angle. Since the LEDs 40 have a relatively high directivity, it is difficult for the image pickup apparatus 2 to receive their light when the controller 20 is inclined greatly. Utilizing this directivity of the LEDs 40, it is possible to significantly reduce the processing load in searching for LED image candidates by performing the LED image extraction process on condition that the inclination from the first LED 40a not exceed a predetermined angle (for example, 45°).

Since the present embodiment uses the differential image between the previous frame image and the current frame image for the above process, the images of the LEDs 40 are excluded from the differential image when the controller 20 is motionless. The use of the differential image therefore does not ensure that LED images will always be found by the LED extraction processing shown in FIG. 10. If no LED image is found in the LED extraction processing shown in FIG. 10, the position estimating unit 104 acquires the position information and orientation information regarding the controller 20 in the previous frame, assuming that the controller 20 has remained stationary in the same position as in the previous frame. At this point, the position estimating unit 104 may extract LED images by using the binary image.

Figure 11:
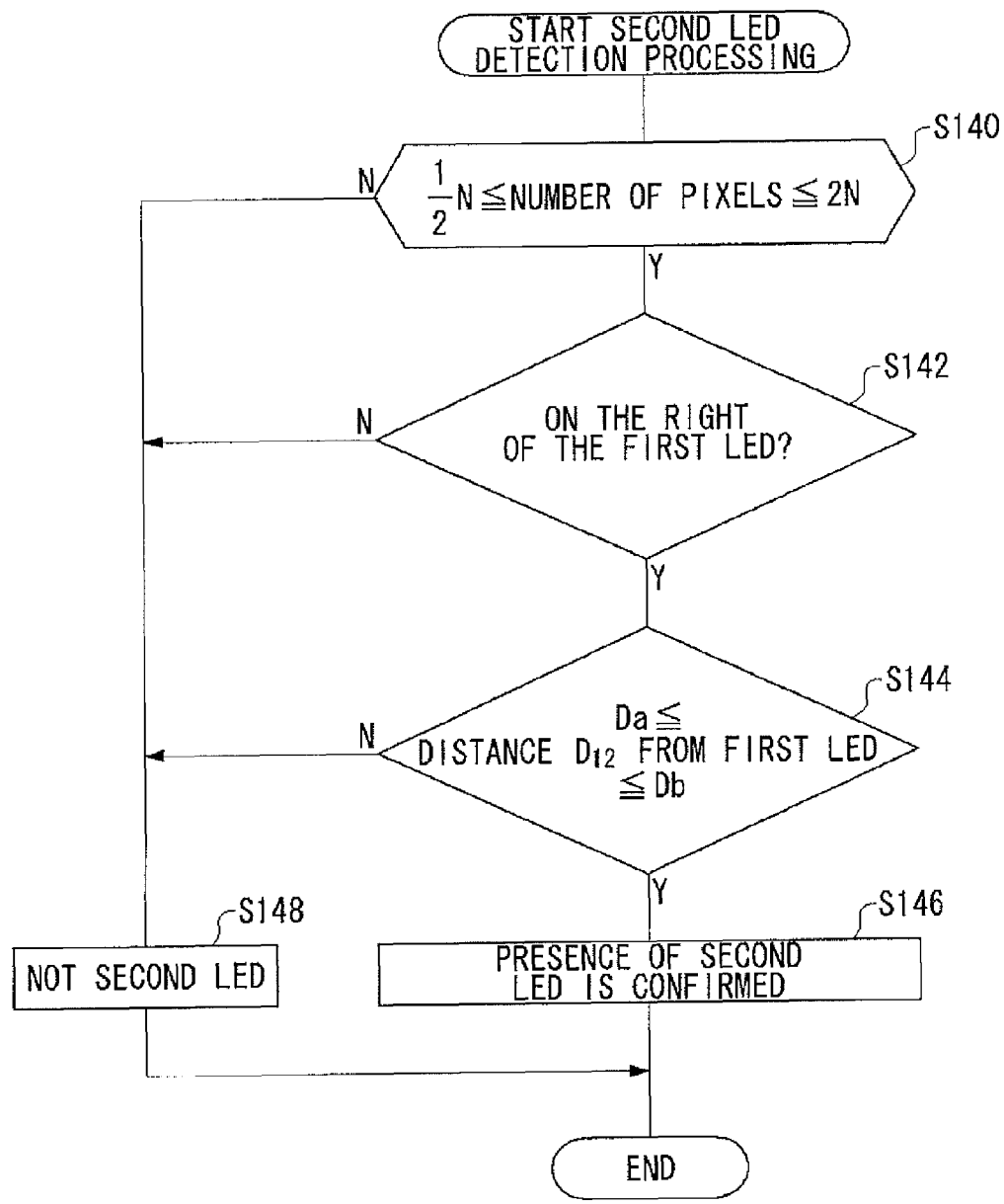
FIG. 11 is a flowchart showing the procedure for second LED detection processing shown in S122 of FIG. 10.

FIG. 11 is a flowchart showing the procedure for the second LED detection process shown in S122 of FIG. 10. Suppose that the number of pixels constituting the LED image candidate that is assumed to be the first LED 40a is N. Initially, the LED image extracting unit 142 determines whether or not an LED image candidate has pixels not less than ½×N and not more than 2N (S140). This is based on the fact that LED images will not be much different from that of the first LED 40a in size or shape. If the number of pixels constituting the LED image candidate falls within the predetermined range around the number of pixels N (Y at S140), the LED image extracting unit 142 determines whether or not the LED image candidate lies on the right of the first LED 40a (S142). Whether it is considered to be to the right or not is determined on the basis of whether or not the LED image candidate falls within the range of 45° top right and 45° bottom right of the first LED 40a. If it is to the right of the first LED 40a (Y at S142), the LED image extracting unit 142 determines whether or not the distance $D_{12}$ between the first LED 40a and the LED image candidate is not less than Da and not greater than Db (S144). This determination is made on the basis that the candidate cannot be the second LED 40b if the two are spaced too close or too far from each other. If the distance $D_{12}$ is not less than Da and not greater than Db (Y at S144), it is determined that the LED image candidate may be the second LED 40b. This confirms the presence of the second LED 40b (S146). On the other hand, if the number of pixels constituting the LED image candidate does not fall within the predetermined range (N at S140), if the candidate is not to the right of the LED 40a (N at S142), or if the distance $D_{12}$ does not fall within the predetermined range (N at S144), then it is determined that the LED image candidate is not the second LED 40b.

Figure 12:
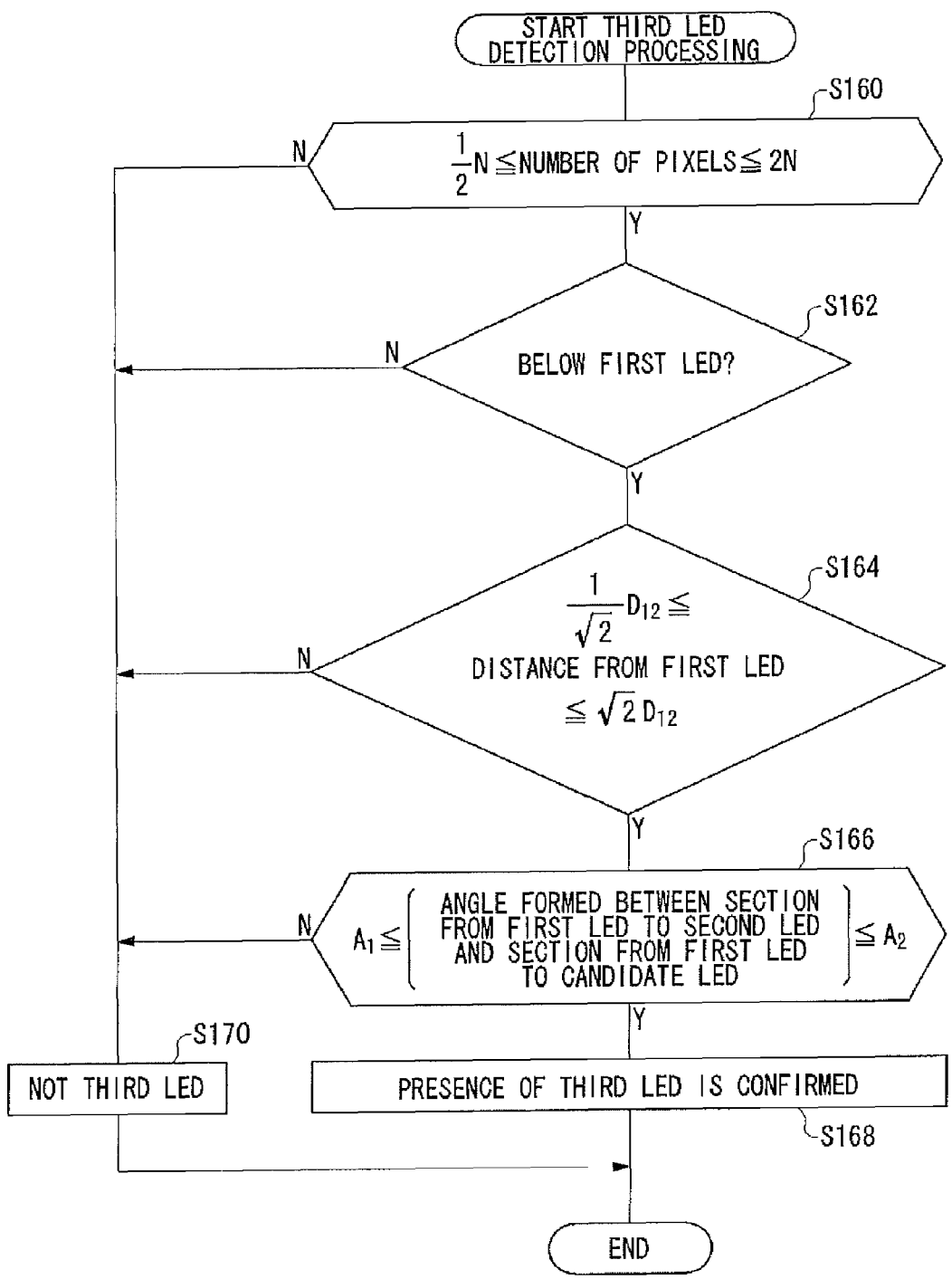
FIG. 12 is a flowchart showing the procedure for third LED detection processing shown in S124 of FIG. 10.

FIG. 12 is a flowchart showing the procedure for the third LED detection process shown in S124 of FIG. 10. Suppose that the number of pixels constituting the LED image candidate that is assumed to be the first LED 40a is N. Initially, the LED image extracting unit 142 determines whether or not an LED image candidate has pixels not less than ½×N and not more than 2N (S160). If the number of pixels constituting the LED image candidate falls within the predetermined range around the number of pixels N (Y at S160), the LED image extracting unit 142 determines whether or not the LED image candidate lies below the first LED 40a (S162). Whether it is considered to be below or not is determined on the basis of whether or not the LED image candidate falls within the range of 45° bottom left and 45° bottom right of the first LED 40a. If it is below the LED 40a (Y at S162), the LED image extracting unit 142 determines whether or not the distance between the first LED 40a and the LED image candidate is not less than $1/\sqrt{2} \times D_{12}$ and not greater than $\sqrt{2} \times D_{12}$ (S164). This determination is made on the basis that the candidate cannot be the third LED 40c if the two are spaced too close or too far from each other. If the distance is not less than $1/\sqrt{2} \times D_{12}$ and not greater than $\sqrt{2} \times D_{12}$ (Y at S164), the LED image extracting unit 142 determines whether or not the angle formed between the segment from the first LED 40a to the second LED 40b and the segment from the first LED 40a to the LED image candidate falls within a predetermined range (S166). At this point, if the angle falls within the predetermined range (Y at S166), it is determined that the LED image candidate may be the third LED 40c. This confirms the presence of the third LED 40c (S168). On the other hand, if the number of pixels constituting the LED image candidate does not fall within the predetermined range (N at S160), if the candidate is not below the LED 40a (N at S162), if the distance from the first LED 40a does not fall within the predetermined range (N at S164), or if the angle does not fall within the predetermined range (N at S166), then it is determined that the LED image candidate is not the third LED 40c (S170).

Figure 13:
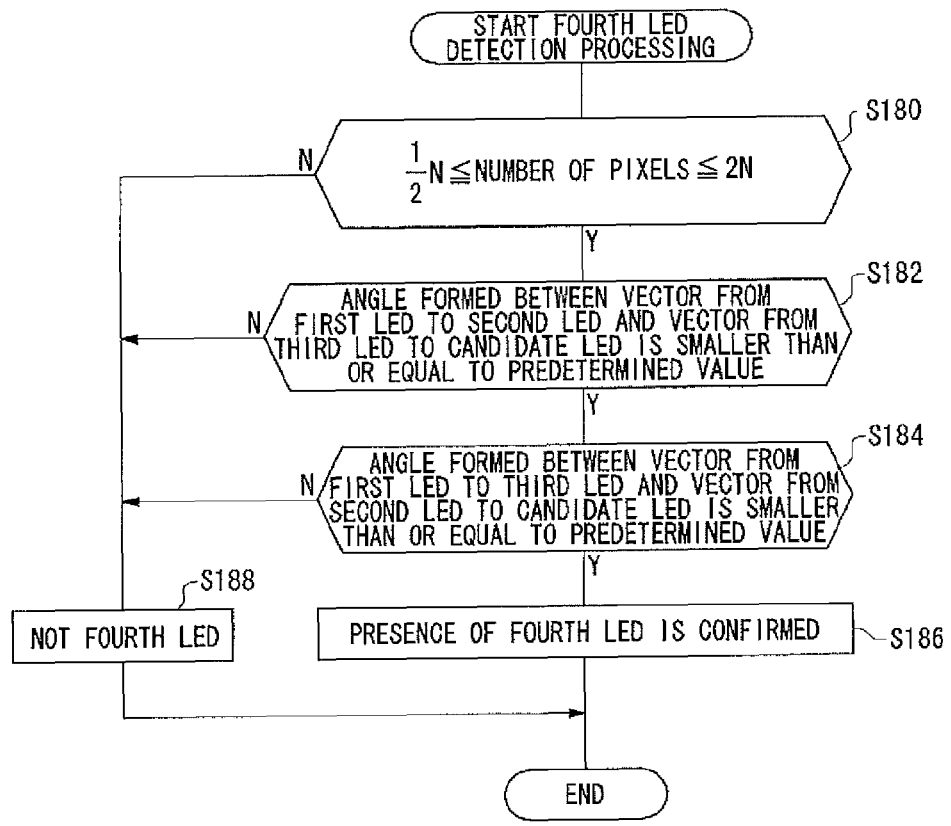
FIG. 13 is a flowchart showing the procedure for fourth LED detection processing shown in S126 of FIG. 10.

FIG. 13 is a flowchart showing the procedure for the fourth LED detection process shown in S126 of FIG. 10. Suppose that the number of pixels constituting the LED image candidate that is assumed to be the first LED 40a is N. Initially, the LED image extracting unit 142 determines whether or not an LED image candidate has pixels not less than ½×N and not more than 2N (S180). If the number of pixels constituting the LED image candidate falls within the predetermined range around the number of pixels N (Y at S180), the LED image extracting unit 142 determines whether or not the angle formed between a vector extending from the first LED 40a to the second LED 40b and a vector extending from the third LED 40c to the LED image candidate is not greater than a predetermined value (S182). If the angle formed between the vector extending from the first LED 40a to the second LED 40b and the vector extending from the third LED 40c to the LED image candidate is smaller than or equal to the predetermined value (Y at S182), then the LED image extracting unit 142 determines whether or not the angle formed between a vector extending from the first LED 40a to the third LED 40c and a vector extending from the second LED 40b to the LED image candidate is not smaller than a predetermined value (S184). If the angle formed between the vector extending from the first LED 40a to the third LED 40c and the vector extending from the second LED 40b to the LED image candidate is smaller than or equal to the predetermined value (Y at S184), it is determined that the LED image candidate may be the fourth LED 40d. This confirms the presence of the fourth LED 40d (S186). On the other hand, if the number of pixels constituting the LED image candidate does not fall within the predetermined range (N at S180), if the angle formed between the vector extending from the first LED 40a to the second LED 40b and the vector extending from the third LED 40c to the LED image candidate exceeds the predetermined value (N at S182), or if the angle formed between the vector extending from the first LED 40a to the third LED 40c and the vector extending from the second LED 40b to the LED image candidate exceeds the predetermined value (N at S184), then the LED image candidate is determined not to be the fourth LED 40d (S188).

Through the foregoing process, the LED image extracting unit 142 can extract the images of the first LED 40a to the fourth LED 40d from the AND image. Position information regarding the extracted images of the first LED 40a to the fourth LED 40d is sent to the position estimating unit 104.

The position estimating unit 104 acquires position information regarding the images of the first LED 40a to the fourth LED 40d in the frame image based on the two-dimensional arrangement of the LEDs 40 on the controller 20. The position estimating unit 104 determines an affine transformation between the extracted first LED 40a, second LED 40b, third LED 40c, and fourth LED 40d, and thereby calculates the position and orientation of the controller 20 in real space. The position of the controller 20 in real space is expressed by coordinates (X, Y, Z) on an orthogonal coordinate system. The orientation in real space is expressed by the angles of rotation around the X-axis, the Y-axis, and the Z-axis. Determining the coordinates and the angles of rotation as to the three axes, the position estimating unit 104 can estimate the position within the space, including the distance from the image pickup apparatus 2. The position estimating unit 104 may also determine an affine transformation to estimate the position of the controller 20 within a frame image. For example, the XY coordinates in XYZ space can be used to obtain the position within the frame image. The position estimating unit 104 sends the estimated position and orientation of the controller 20 to the application processing unit 110.

To avoid misidentification of the LEDs 40, the position estimating unit 104 processes the currently acquired positions of the LED images as an error if the amount of change between the previously acquired positions of the LED images and the currently acquired positions of the LED images exceeds a predetermined value. That is, when the positions or orientations vary more than a predetermined value during a single frame, it might be the case that other objects are possibly misidentified as the LEDs 40 due to foreign factors. The extracted position information regarding the LEDs 40 is discarded for this reason.

Even in those cases, however, the controller 20 might actually be moved by that large amount of change. Therefore, the position estimating unit 104 may count the number of errors occurring in succession, and process the acquired positions of the LED images as normal ones when the count reaches a predetermined value.

The position estimating unit 104 can also estimate the directions of movement and the speeds of movement of the LEDs 40, for example, based on the current frame image or the AND image. For example, when the shutter speed of the image pickup apparatus 2 is reduced, the LEDs 40 may be captured as elliptic or rectangular images. Accordingly, the directions of movement as well as the moving speeds can be estimated from the shapes of the LED images. For example, if the directions and the speeds of movement can be estimated, it is possible to estimate the position and orientation of the controller 20 even if the controller 20 abruptly disappears from the view of the image pickup apparatus 2. When the shapes of all the LEDs 40 are leaning in the same direction, the direction and the speed of movement of the controller 20 may be estimated.

The application processing unit 110 reflects the estimated position and orientation of the controller 20 as a game input in the processing of the game application. This reflection may be effected in various ways. In a most intuitive fashion, a virtual object following the estimated position of the controller 20 may be displayed at the corresponding position in the game image. When the user moves the controller 20 with respect to the image pickup apparatus 2, the virtual object can be moved to follow the motion in the game image.

It should be appreciated that the positions and orientations of the LEDs 40 are ideally determined in each frame image and accordingly reflected on the game images in succession. Nevertheless, it may sometimes be impossible to determine the positions and orientations of the LEDs 40 in frame images, depending on environmental conditions including the orientation of the controller 20 and the ambient light. When such a condition lasts for a period of time and then the positions and orientations of the LEDs 40 are suddenly reacquired, it follows that the virtual object at rest suddenly jumps to the new position, which is disconcerting for the user. Therefore, even if the positions and orientations of the LEDs 40 can be detected from the AND image again, the virtual object will not be moved to the acquired position on the game image. Instead, follow-up processing will be performed so that the virtual object can move smoothly even when there is some information loss.

Figure 14A:
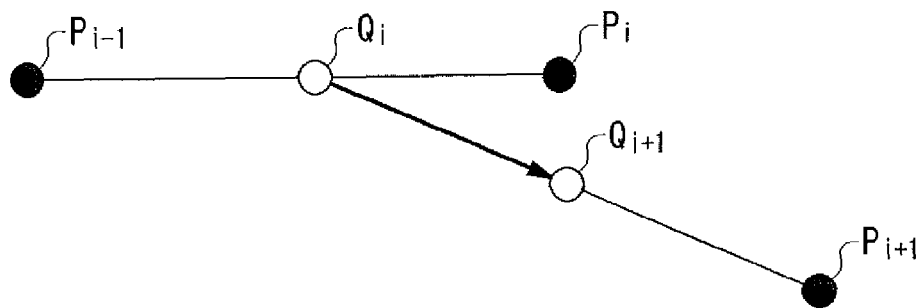
FIGS. 14A and 14B are diagrams for explaining an algorithm by which a virtual object corresponding to the controller makes a smooth follow-up operation within a game screen.
Figure 14B:
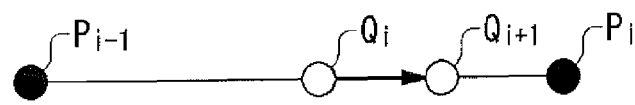

FIGS. 14A and 14B are diagrams for explaining an algorithm by which the virtual object corresponding to the controller makes a smooth follow-up operation within the game screen. For the sake of convenience, the following description will deal with the case where the virtual object changes in position. The same algorithm can also be applied to a change of orientation.

Suppose that the position estimating unit 104 determines affine transformations, and position parameters $P_{i-1}$, $P_i$, and $P_{i+1}$ are derived (the suffix of P indicates the number of the frame of the game screen). Initially, a description will be given of the case where the frame image switches and the position parameter changes from $P_i$ to $P_{i+1}$.

When the new position parameter ($P_{i+1}$) is obtained, a position parameter to be reflected on the game screen is given by the following equation:

$$Q_{i+1}(Q_i+P_{i+1})/2.$$

That is, instead of shifting to the new position parameter $P_{i+1}$ directly, a new position parameter on the game screen is set to the midpoint between the position parameter of the previous frame on the game screen and the new position parameter $P_{i+1}$ of the current frame. It should be appreciated that the position parameter $Q_{i+1}$ may not necessarily be the midpoint between the position parameter $Q_i$ and the position parameter $P_{i+1}$, but may be a different point that sections the segment between the position parameter $Q_i$ and the position parameter $P_{i+1}$ at A:B.

FIG. 12B shows an example where the position parameter $P_{i+1}$ cannot be acquired. This algorithm is effective in such cases. Here, the last position parameter is used instead of $P_{i+1}$:

$$Q_{i+1}=(Q_i+P_i)/2,$$

where $P_i$ is the last position parameter.

When position parameters Q on the game screen are acquired by this algorithm, it is possible to move the virtual object in continuous steps even when the controller 20 makes large movements in space or when it cannot be extracted from AND images. This can avoid situations such as the virtual object suddenly freezing or suddenly moving in the game image, and can achieve smooth follow-up processing for the controller 20.

Up to this point, the present invention has been described in conjunction with the embodiment thereof. This embodiment is given solely by way of illustration. It will be understood by those skilled in the art that various modifications may be made to combinations of the foregoing components and processes, and all such modifications are also intended to fall within the scope of the present invention.

In the embodiment, the image pickup apparatus 2 captures an image of the controller 20, and the position and orientation of the controller 20 are estimated from the frame images. The position information and the orientation information are then reflected in the processing of the game application. The LEDs 40 of the controller 20 may be lit in different lighting patterns, for example, depending on the progress of the game application.

Immediately after the user joins the game application, the game apparatus 10 may transmit a control signal to the controller 20 so that the four LEDs 40 are blinked at a predetermined low frequency. The blink instruction unit 106 generates a control signal for instructing the controller 20 about a blink pattern of a predetermined low frequency. This low-frequency blink control signal is transmitted from the wireless communication module 108 to the controller 20. It should be appreciated that if there are a plurality of controllers 20, the controllers 20 are given respective different blink frequencies.

The controller 20 blinks the LEDs 40 at the instructed low frequency, and the image pickup apparatus 2 captures frame images at capturing cycles of 30 frames/second. From the plurality of frame images, the game apparatus 10 extracts the images of LEDs that are lit on/off at the predetermined cycles. If the game system 1 includes a plurality of controllers 20, the controllers 20 are given respective different lighting cycles. This makes it possible to check the positions of the controllers 20, and identify each controller 20 separately. This process ideally needs only be performed once after the user joined the game application. In real space, however, controllers 20 may suddenly disappear from the view of the image pickup apparatus 2. For that reason, the controllers 20 may blink the LEDs 40 at low frequencies set for the respective controllers at predetermined intervals such as every few seconds.

For example, when the four LEDs 40 are blinked at a low frequency, frames in which the LEDs 40 can be captured and frames in which they cannot will occur alternately at predetermined intervals. If the LEDs 40 are controlled to light on/off at 45 Hz with respect to a capturing cycle of 30 frames/seconds, then the LEDs 40 are alternately captured in two consecutive frames and not in the next two. Since the LEDs 40 are captured in some frame images and not in others, it is possible to acquire position information even if the LEDs 40 are motionless.

Here, the low-frequency lighting refers to the mode of lighting at frequencies such that the lighted LEDs are captured in some frames and not in others, with respect to the capturing cycles. High-frequency lighting, on the other hand, refers to the mode of lighting at frequencies such that the lighted LEDs are always captured in frame images, with respect to the capturing cycles (30 frames/second) of the image pickup apparatus 2. For example, even when the LEDs 40 are blinked at 1 kHz, the lighted LEDs can be captured in some frames and not in others if the capturing cycle of the image pickup apparatus 2 is extremely short. This makes it possible to acquire position information even if the LEDs 40 are motionless.

The positions and orientations of the LEDs 40 that are blinked at high frequencies are used as an input to the game application. Then, the position information regarding the controller 20, estimated by the position estimating unit 104, is sent to the application processing unit 110 in succession and reflected in the processing of the application. User's operation inputs on the arrow key 21 and the like of the controller 20 are also sent to the application processing unit 110 through the wireless communication module 108. The application processing unit 110 advances the game based on the position and orientation information regarding the controller 20 and the operation inputs from the controller 20, and generates image signals and sound signals that show the results of the processing of the game application.

In a modification, one of the four LEDs 40 can be lit with a blink pattern different from that of the other LEDs 40 so that the particular LED 40 can be identified. For example, when three LEDs are blinked at a high frequency and one LED is blinked at a low frequency, it is possible, for example, to check which is the first LED 40*a* in the frame image.

By detecting the position and orientation of the controller 20 in real space and reflecting them in the processing of a game application, it is possible to realize new types of game applications. Take a tennis game, for example. The controller 20 can be moved to advance the game, provided that the height of the controller 20 in a frame image represents the height of the point where a tennis ball is hit, the direction of the controller 20 the direction of the hit ball, and the moving speed of the controller 20 the power to hit the ball. Since these motions are similar to those of swinging a real racket, it is possible to give the user a sensory experience similar to actually playing tennis. In this case, since the buttons and keys of the controller 20 can also be used as game inputs, it is possible to provide sensuously innovative ways for a user to make game inputs while maintaining conventional game operation inputs. In this way, the LEDs provided as indicators on the controller 20 can be fully utilized to further enhance the variety of game applications available.

For example, the power to hit a ball may be determined by button operations on the controller 20.
The conventional type of button operations and the innovative ways of game inputs can be combined to achieve new gameability. For example, it is possible to create a tennis game such that a ball can be tossed up by making a button input while designating the target position for the ball to hit the ground on the opponent side of the court, and a strong service can be made by moving the controller 20.

Another example of the game application is a motorcycle racing game. The orientation of the controller 20 may be manipulated and utilized as game inputs for controlling a motorcycle. Here, the speed may be determined by the moving speed of the controller 20, or may be determined by button inputs. As stated above, the conventional type of button inputs, static inputs made by the position and orientation of the controller 20, and dynamic inputs based on changes of state, such as the moving speed of the controller 20, can be used in combination to improve the operability of game applications.

For example, when the controller 20 is about to go out of the screen of the image display apparatus 3, the application processing unit 110 may notify the user of the possibility of going out based on the position information on the controller 20. Moreover, when the controller 20 is about to go out of screen, the application processing unit 110 may generate a vibration control signal for making the controller 20 vibrate its vibrator, and transmit it from the wireless communication module 108. Furthermore, when a virtual object that follows the movement of the controller 20 is displayed on the game image, the application processing unit 110 may notify the user of the possibility of going out of screen by moving the virtual object in a manner noticeable to the user. Whether the controller is about to go out or not may be determined, for example, based on position in frame images. The notification processing may be performed when the position of the controller 20 is estimated to be close to the edges of the frame image.

The features of the invention disclosed in the embodiment may be defined by the following items:
(Item 1)
An image processing apparatus which acquires a position of an illuminator image from a frame image input thereto, comprising:
a differential image generating unit which generates a differential image between a previous frame image and a current frame image;
a binary image generating unit which binarizes the current frame image with a threshold, thereby generating a binary image;
a logic operation unit which logically operates on the differential image and the binary image to generate a logic operation image;
an extraction unit which extracts an illuminator image from the logic operation image; and
a position acquisition unit which acquires the position of the illuminator image in the frame image.
(Item 2)
The image processing apparatus according to item 1, wherein the logic operation unit generates the logic operation image by performing an AND operation between pixel values of the differential image and pixel values of the binary image pixel by pixel.
(Item 3)
The image processing apparatus according to item 1 or 2, wherein the extraction unit recognizes a two-dimensional pattern to be formed by a plurality of illuminators in advance, and uses the two-dimensional pattern to extract the illuminator image.
(Item 4)
The image processing apparatus according to any one of items 1 to 3, wherein the position acquisition unit processes the position of an illuminator image acquired currently as an error if the amount of change between the position of an illuminator image acquired previously and the position of the illuminator image acquired currently exceeds a predetermined value.

(Item 5)

The image processing apparatus according to item 4, wherein the position acquisition unit counts the number of errors occurring in succession, and processes the position of an acquired illuminator image as normal or correct one if the count reaches a predetermined value.

INDUSTRIAL APPLICABILITY

The present invention is applicable to an entertainment system with an application processing function, and to an operation input apparatus used in such entertainment system.

The invention claimed is:

1. An entertainment system, comprising:
   an operation input apparatus from which a user makes an operation input;
   a processing apparatus which processes an application based on the operation input and generates an image signal for showing a result of processing of the application;
   an image pickup apparatus which captures an image of the operation input apparatus; and
   an image display apparatus which outputs the image signal generated in the processing apparatus, wherein:
   the operation input apparatus includes: (i) a case having a top surface oriented upwards towards the user when in use, and a rear surface oriented away from the user toward the image pickup apparatus when in use; (ii) a plurality of input units disposed on the case from which a user makes the operation input for advancing the application; and (iii) a plurality of light emitting elements, disposed on the rear surface of the case, operable in two modes: a first mode in which one or more of the plurality of light emitting elements are configured to indicate a number assigned to the operation input apparatus by the processed application, and a second mode in which one or more of the plurality of light emitting elements are configured to provide positions of the light emitting elements to the processing apparatus; and
   the processing apparatus: (i) accepts the operation input provided to the operation input apparatus and reflects the operation input in the processing of the application, (ii) acquires a captured image comprising the image of the operation input apparatus from the image pickup apparatus, (iii) acquires a position of the operation input apparatus in the captured image based on the positions of the light emitting elements operating in the second mode in the captured image and reflects the acquired position information in the processing of the application, and (iv) generates the image signal showing the result of application processing performed based on the operation input and the acquired position information.

2. The entertainment system of claim 1, wherein the operation input apparatus only lights one or more of the light emitting elements corresponding to the number assigned to the operation input apparatus when operating in the first mode, from among the plurality of light emitting elements, so as to allow the one or more light emitting elements to function as an indicator configured to indicate the number.

3. The entertainment system of claim 1, wherein:
   the processing apparatus transmits to the operation input apparatus a control signal for controlling lighting of the light emitting elements; and
   the operation input apparatus lights the light emitting elements according to the control signal.

4. The entertainment system of claim 3, wherein, when the processing apparatus reflects position information of the operation input apparatus in the processing of the application, the processing apparatus transmits to the operation input apparatus either a first control signal for lighting the light emitting elements at a first frequency or a second control signal for lighting the light emitting elements at a second frequency higher than the first frequency.

* * * * *